(12) United States Patent
Harper et al.

(10) Patent No.: US 6,834,903 B2
(45) Date of Patent: Dec. 28, 2004

(54) TAILGATE RAMP SYSTEM

(76) Inventors: Galen R. Harper, 9745 N. Taos Rd., Healy, KS (US) 67850-6002; Bill Kern, 4920 Pebble La., Wamego, KS (US) 66547

( * ) Notice: Subject to any disclaimer, the term of this patent is extended or adjusted under 35 U.S.C. 154(b) by 0 days.

(21) Appl. No.: 10/369,252

(22) Filed: Feb. 18, 2003

(65) Prior Publication Data

US 2004/0160079 A1 Aug. 19, 2004

(51) Int. Cl.[7] .......................................... B62D 33/023
(52) U.S. Cl. ............................. 296/51; 296/61; 296/62
(58) Field of Search ..................... 296/26.1, 51, 57.1, 296/61, 60, 62; 14/71.1; 414/537

(56) References Cited

U.S. PATENT DOCUMENTS

| | | | |
|---|---|---|---|
| 2,806,735 A | 9/1957 | Smith | 296/51 |
| 3,642,156 A * | 2/1972 | Stenson | 296/61 |
| 4,750,777 A | 6/1988 | Brammer | 296/50 |
| 5,244,335 A | 9/1993 | Johns | 414/537 |
| 5,312,149 A | 5/1994 | Boone | 296/61 |
| 5,536,058 A | 7/1996 | Otis | 296/61 |
| 5,540,474 A | 7/1996 | Holland | 296/61 |
| 5,597,195 A * | 1/1997 | Meek | 296/61 |
| 5,685,594 A | 11/1997 | Harper | 296/51 |
| 5,803,523 A | 9/1998 | Clark et al. | 296/26.1 |
| D399,468 S | 10/1998 | Lund et al. | D12/196 |
| 5,988,725 A * | 11/1999 | Cole | 296/61 |
| 6,155,622 A * | 12/2000 | Reed | 296/57.1 |
| 6,484,344 B1 * | 11/2002 | Cooper | 14/71.1 |
| 2002/0172584 A1 * | 11/2002 | Huggins | 296/61 |
| 2003/0122396 A1 * | 7/2003 | Humphrey et al. | 296/51 |

* cited by examiner

*Primary Examiner*—Jason Morrow
(74) *Attorney, Agent, or Firm*—Dale J. Ream

(57) ABSTRACT

A tailgate ramp system for providing a safe and convenient system for loading/unloading all-terrain vehicles. The tailgate ramp system includes a pair of telescoping structures pivotally attached to a pickup box, wherein each telescoping structure is comprised of a frame structure and a plurality of telescoping sections slidably positioned within the frame structure. The telescoping sections have cross members for supporting the wheels of a vehicle during loading/unloading thereof.

20 Claims, 10 Drawing Sheets

TAILGATE RAMP SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle tailgates and more specifically it relates to a tailgate ramp system for providing a safe and convenient system for loading/unloading all-terrain vehicles.

2. Description of the Related Art

Loading ramps for vehicles have been in use for years. A conventional loading ramp is comprised of an elongate rigid structure that is extended between the vehicle and the ground surface at an angle for loading an ATV or other item.

The main problem with conventional loading ramps is that they are unsafe to load/unload an ATV. Loading ramps are susceptible to being misaligned thereby causing the ATV to fall off the loading ramps during loading/unloading thereof. A further problem is that loading ramps will sometimes fall from the vehicle while loading/unloading because they are not secured to the vehicle. Another problem with conventional loading ramps is that they require a significant amount of storage room within the vehicle making them difficult to transport.

Examples of patented devices which may be related to the present invention include U.S. Pat. No. 5,312,149 to Boone; U.S. Pat. No. 5,536,058 to Otis; U.S. Pat. No. 5,244,335 to Johns; U.S. Pat. No. 4,750,777 to Brammer; U.S. Pat. No. 5,540,474 to Holland; U.S. Pat. No. 5,685,594 to Harper; U.S. Pat. No. 5,803,523 to Clark et al.; U.S. Pat. No. 2,806,735 to Smith; and U.S. Pat. No. 399,468 to Lund et al.

While these devices may be suitable for the particular purpose to which they address, they are not as suitable for providing a safe and convenient system for loading/unloading all-terrain vehicles. Conventional loading ramps are unsafe and difficult to store during nonusage.

In these respects, the tailgate ramp system according to the present invention substantially departs from the conventional concepts and designs of the prior art, and in so doing provides an apparatus primarily developed for the purpose of providing a safe and convenient system for loading/unloading all-terrain vehicles.

BRIEF SUMMARY OF THE INVENTION

In view of the foregoing disadvantages inherent in the known types of loading ramps now present in the prior art, the present invention provides a new tailgate ramp system construction wherein the same can be utilized for providing a safe and convenient system for loading/unloading all-terrain vehicles.

The general purpose of the present invention, which will be described subsequently in greater detail, is to provide a new tailgate ramp system that has many of the advantages of the loading ramps mentioned heretofore and many novel features that result in a new tailgate ramp system which is not anticipated, rendered obvious, suggested, or even implied by any of the prior art loading ramps, either alone or in any combination thereof.

To attain this, the present invention generally comprises a pair of telescoping structures pivotally attached to a pickup box, wherein each telescoping structure is comprised of a frame structure and a plurality of telescoping sections slidably positioned within the frame structure. The telescoping sections have cross members for supporting the wheels of a vehicle during loading/unloading thereof.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tailgate ramp system that will overcome the shortcomings of the prior art devices.

A second object is to provide a tailgate ramp system for providing a safe and convenient system for loading/unloading all-terrain vehicles.

Another object is to provide a tailgate ramp system that operates as both a tailgate and loading ramps.

An additional object is to provide a tailgate ramp system that allows easy access to the interior of a pickup box without having to lower/lift a tailgate.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
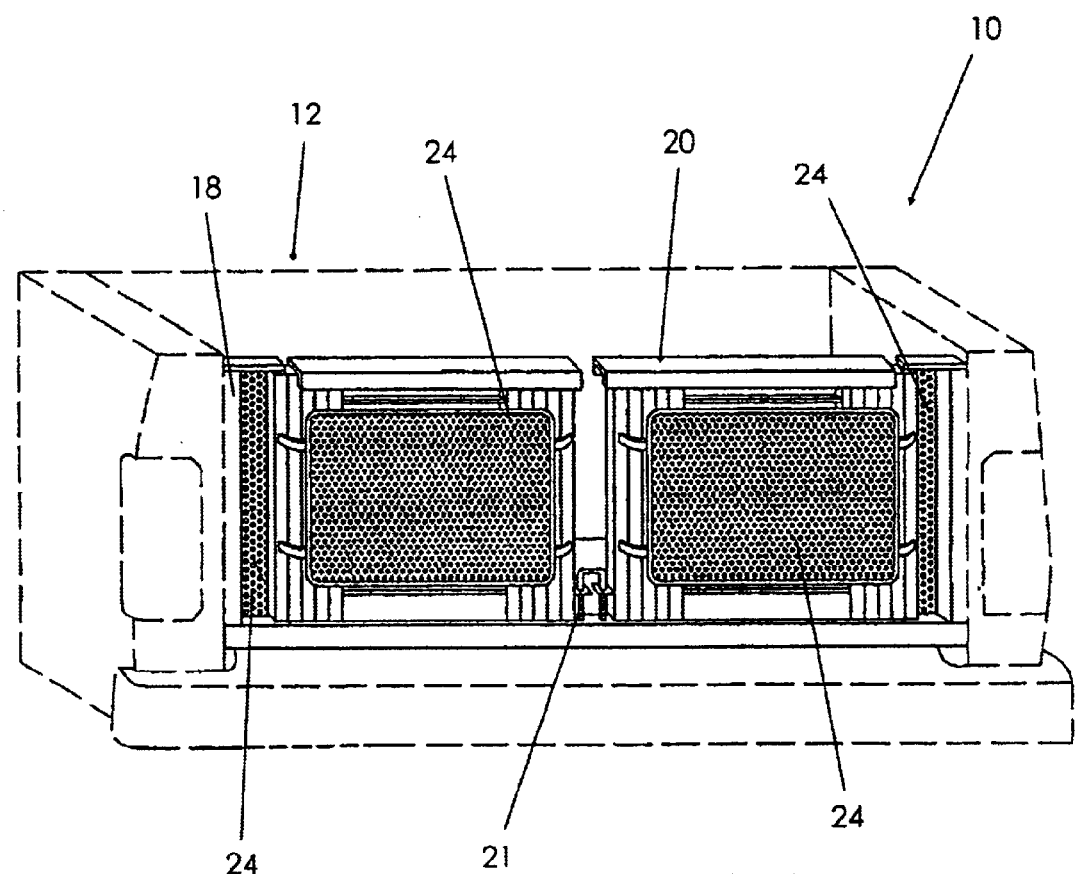
FIG. 1 is an upper perspective view of the present invention attached to a pickup box in the closed position.

Turning now descriptively to the drawings, in which similar reference characters denote similar elements throughout the several views, FIGS. 1 through 10 illustrate a tailgate ramp system 10, which comprises a pair of telescoping structures pivotally attached to a pickup box 12, wherein each telescoping structure is comprised of a frame structure 20 and a plurality of telescoping sections slidably positioned within the frame structure 20. The telescoping sections have cross members for supporting the wheels of a vehicle during loading/unloading thereof.

As shown in FIGS. 1 through 7 illustrate the main frame 18 of the present invention. The main frame 18 of the present invention has a U-shaped structure that is pivotally retained within the rear of a pickup box 12 similar to a conventional tailgate with the lower pivot shafts received within receivers within the pickup box 12. The main frame 18 further preferably includes a pair of latching mechanisms on both sides of the main frame 18 for selectively retaining the main frame 18 within a closed position upon the pickup box 12. The main frame 18 preferably has a hollow central portion for receiving the telescoping structures.

Figure 2:
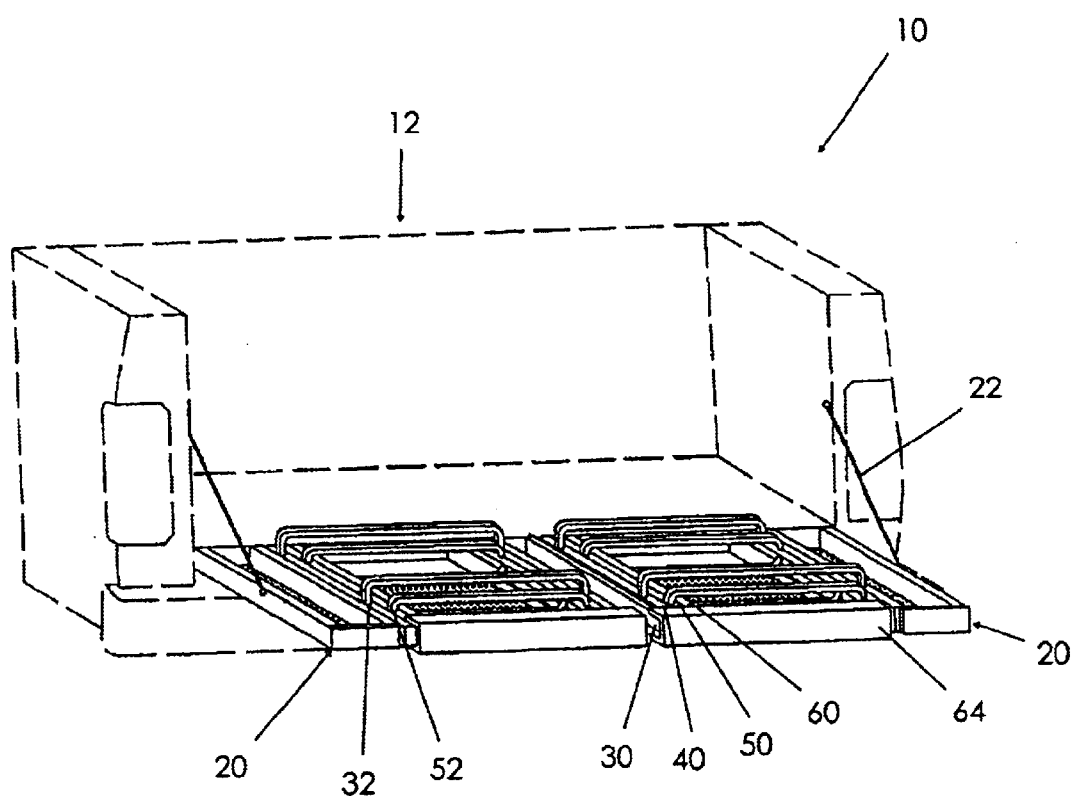
FIG. 2 is an upper perspective view of the present invention attached to a pickup box in the initial extended position.
Figure 8:
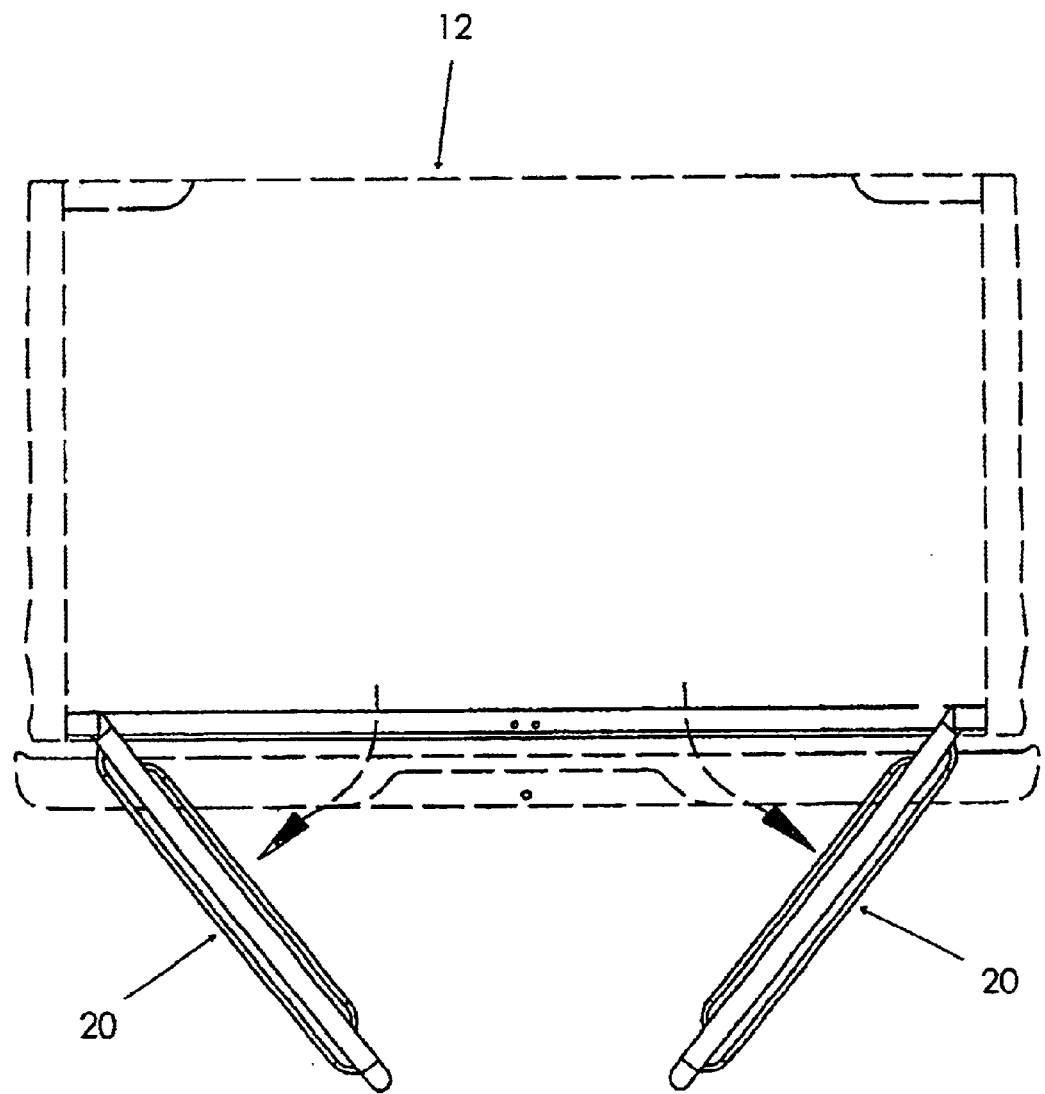
FIG. 8 is a top view of the present invention illustrating the swinging of the invention along a horizontal plane.

As shown in FIGS. 1 and 2 of the drawings, illustrate the pair of telescoping structures that are rotatably and pivotally attached within the main frame 18. The telescoping structures preferably are rotatably attached to the main frame 18 to rotate within a horizontal plane as shown in FIG. 8 of the drawings. The telescoping structures are also preferably rotatably positioned within the main frame 18 to rotate along a vertical plane as shown in FIGS. 2 through 6 of the drawings.

The telescoping structures each have a frame structure 20 that has a pair of opposing frame channels 26 as shown in FIGS. 1 through 7 of the drawings. One or more grate members 24 are positioned within the frame structure 20 as best illustrated in FIGS. 3 through 6 of the drawings. Various other structures may be utilized instead of the grate members 24 such as bar members and the like.

Figure 6:
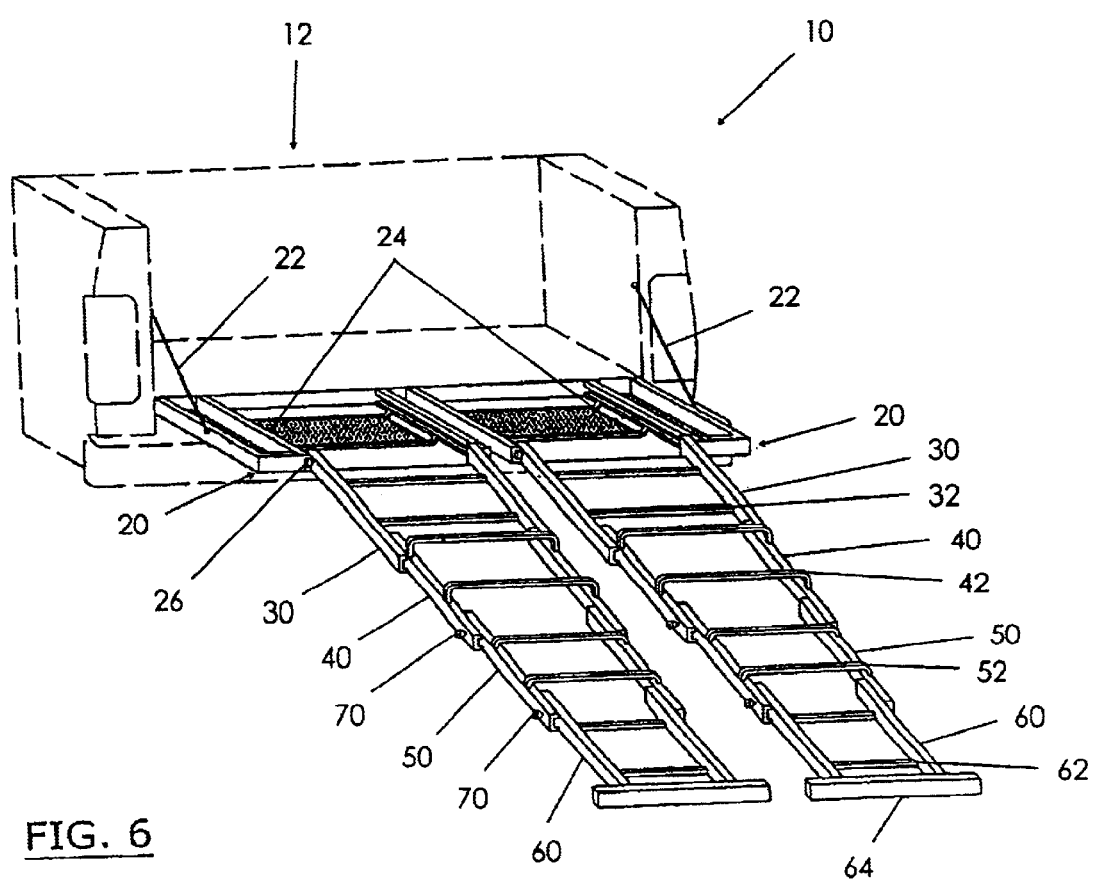
FIG. 6 is an upper perspective view of the present invention attached to a pickup box with the ramp sections full removed and extended from the frame structure.

A plurality of sections 30, 40, 50, 60 are telescopically supported within the frame structure 20. The sections 30, 40, 50, 60 each have a plurality of roller members 70 extending from the sides thereof and a corresponding plurality of cross members 32, 42, 52, 62 for supporting the wheels of the vehicle during loading/unloading as shown in FIG. 6 of the drawings. The cross members 32, 42, 52, 62 preferably have a U-shaped structure which may also be inverted as shown in FIGS. 1 through 6 of the drawings.

Figure 9:
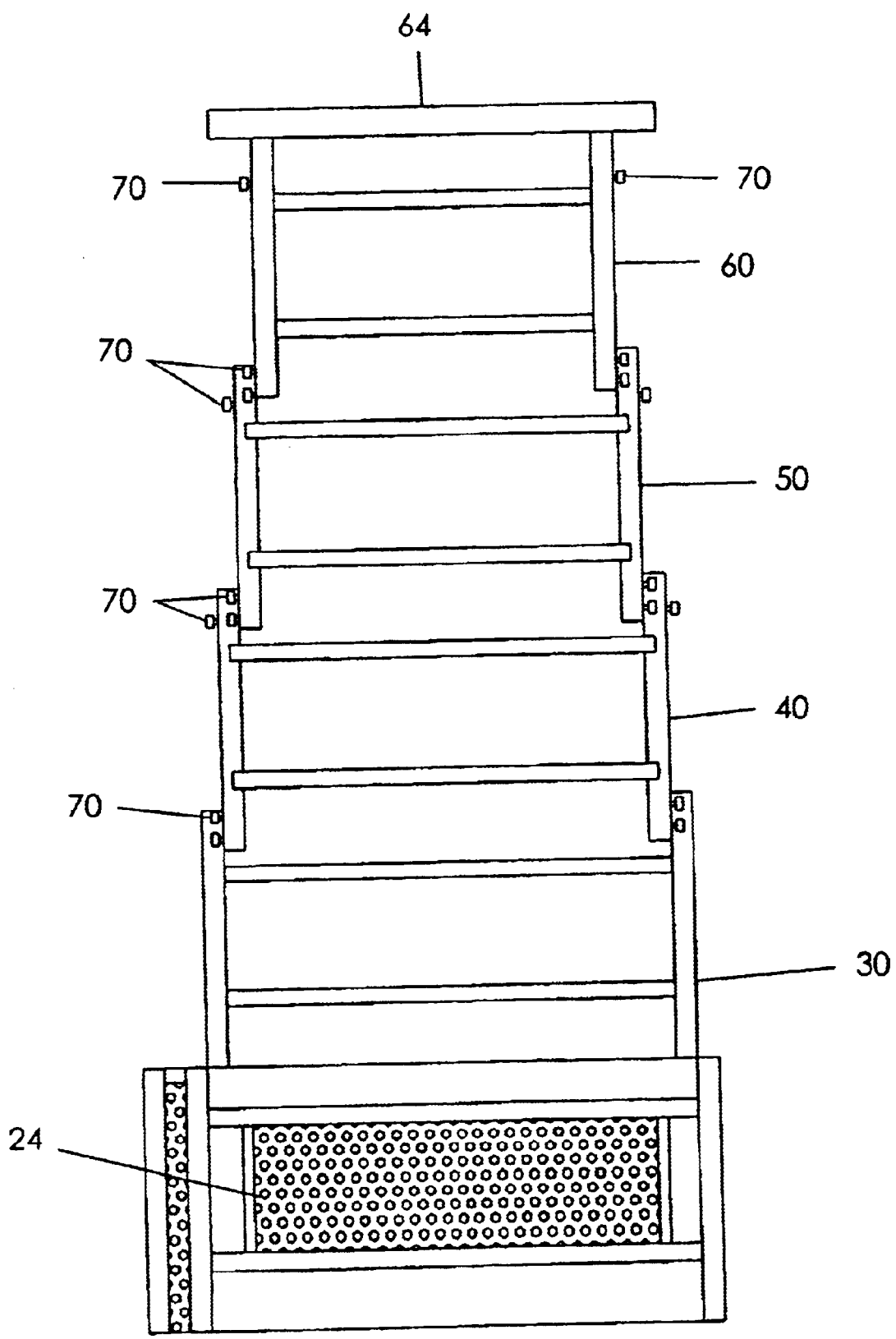
FIG. 9 is a top view of the present invention in the fully extended position.

There can be various numbers of sections 30, 40, 50, 60 as desired. Each of the sections 30, 40, 50, 60 is slidably retained within the other. The sections 30, 40, 50, 60 each have interior channels that receive the roller members 70 from the section as best illustrated in FIGS. 6 and 9 of the drawings. The cross members 32, 42, 52, 62 are sized to allow for the contraction of the plurality of sections 30, 40, 50, 60 without interference. The end of the sections 30, 40, 50, 60 preferably receives an end member for engaging the ground surface or other structure to load from or to.

Figure 3:
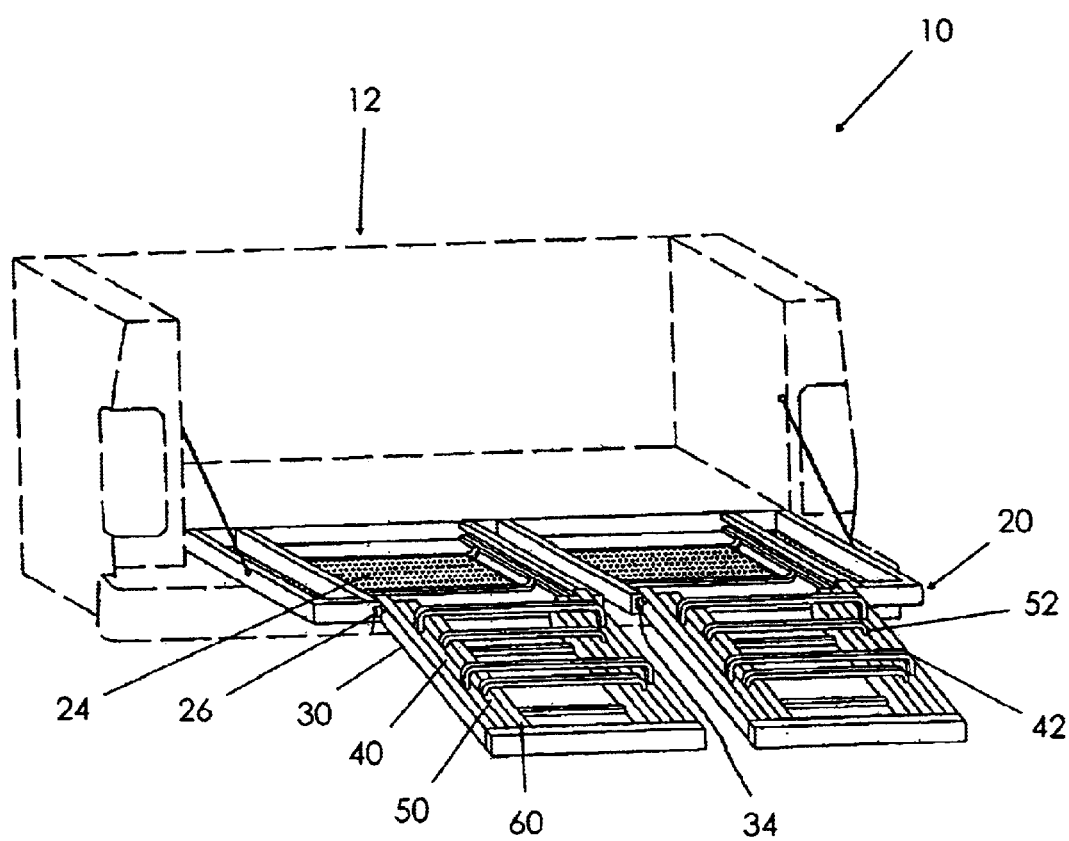
FIG. 3 is an upper perspective view of the present invention attached to a pickup box with the ramp sections partially removed from the frame structure.
Figure 4:
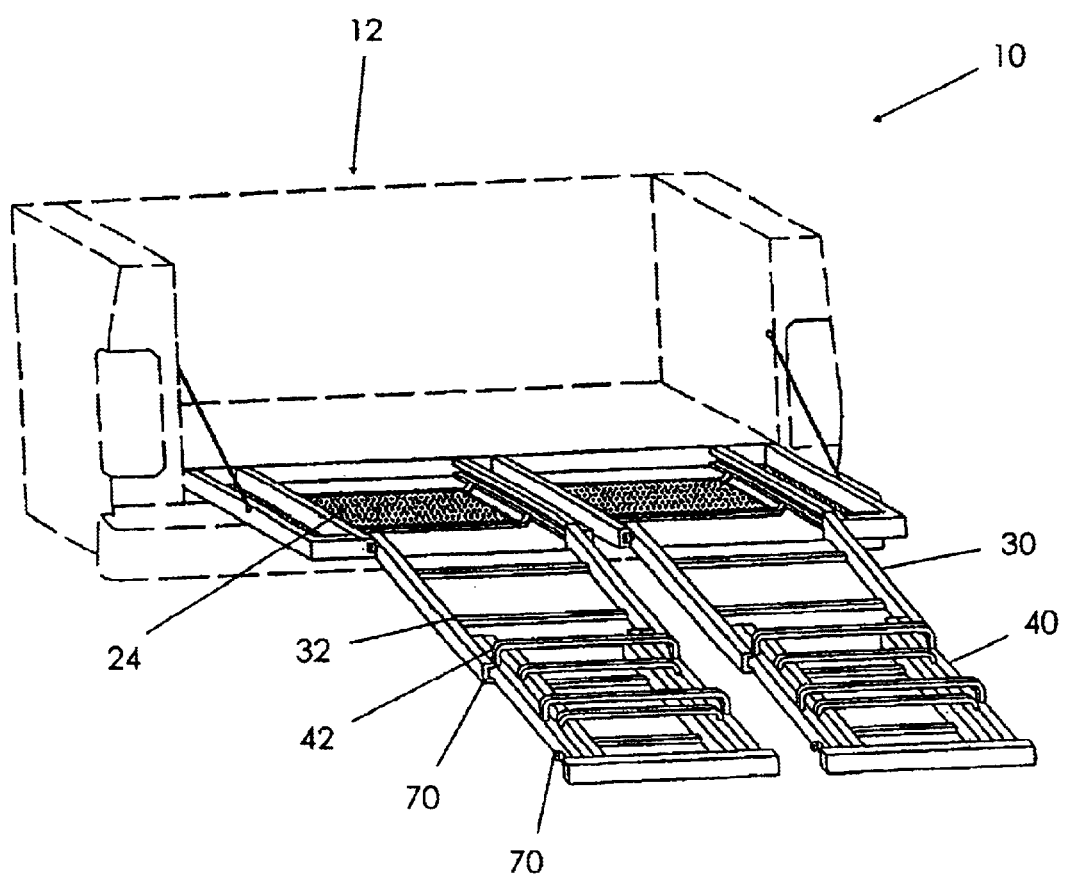
FIG. 4 is an upper perspective view of the present invention attached to a pickup box with the ramp sections further removed from the frame structure.
Figure 5:
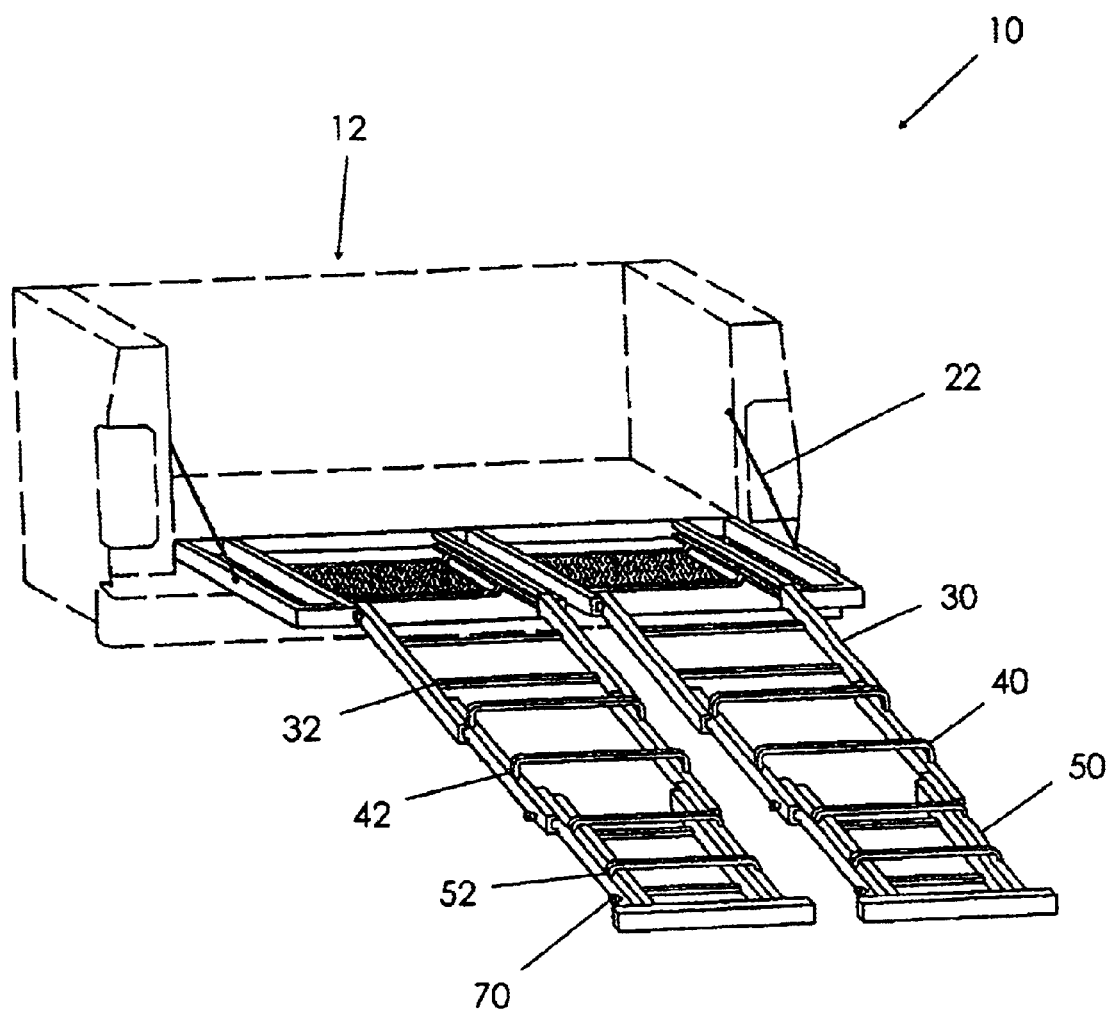
FIG. 5 is an upper perspective view of the present invention attached to a pickup box with the ramp sections further removed from the frame structure.

As shown in FIG. 9 of the drawings, the first section 30 has a single set of roller members 70 that are retained within the frame channels 26. The roller members 70 are retained within the frame channels 26 by a stopper member or similar stopping device within the frame channels 26. The first section 30 is able to pivot along with sliding with respect to the frame structure as shown in FIGS. 2 and 3 of the drawings.

Figure 10:
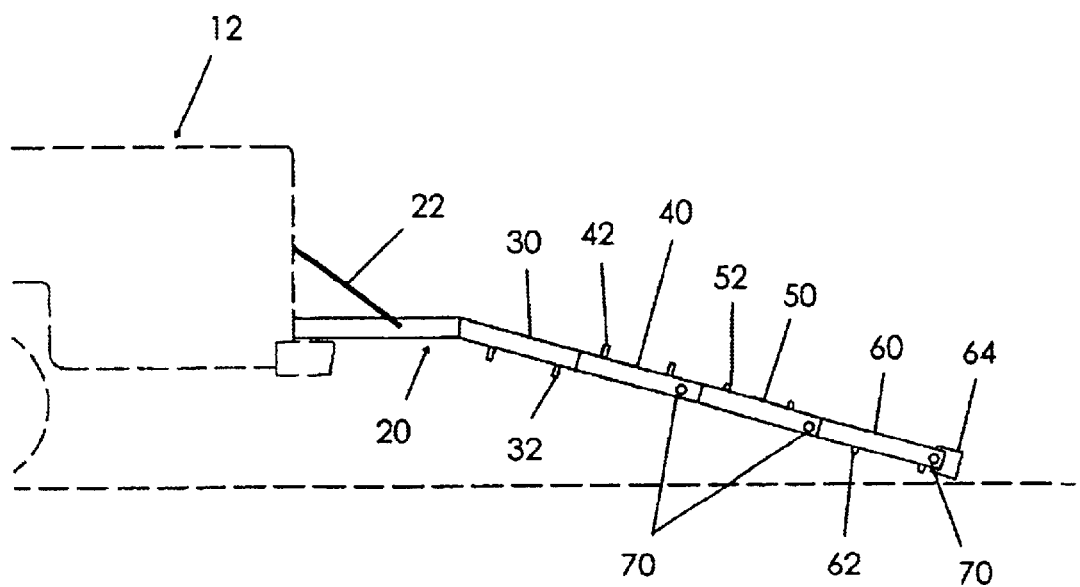
FIG. 10 is a side view of the present invention fully extended from a vehicle.

The first section 30 has a larger width than the second section 30 as best illustrated in FIG. 9 of the drawings. The first section 30 defines channels within that receive roller members 70 extending from the second section 40. The second section 40 preferably has two sets of roller members within a distal end thereof for retaining a relatively parallel structure with respect to the first section 30 as shown in FIGS. 9 and 10 of the drawings. The second section 40 further preferably includes another set of roller members 70 at the opposing end thereof for guiding the second section within the channels of the first section 30.

The second section 40 has a larger width than the third section 50 as best illustrated in FIG. 9 of the drawings. The second section 40 defines channels within that receive roller members 70 extending from the third section 50. The third section 50 preferably has two sets of roller members within a distal end thereof for retaining a relatively parallel structure with respect to the second section 40 as shown in FIGS. 9 and 10 of the drawings. The third section 50 further preferably includes another set of roller members 70 at the opposing end thereof for guiding the second section within the channels of the second section 40.

The third section 50 has a larger width than the fourth section 60 as best illustrated in FIG. 9 of the drawings. The third section 50 defines channels within that receive roller members 70 extending from the fourth section 60. The fourth section 60 preferably has two sets of roller members within a distal end thereof for retaining a relatively parallel structure with respect to the third section 50 as shown in FIGS. 9 and 10 of the drawings. The fourth section 60 further preferably includes the end member 64 attached thereto.

A securing structure 21 is attached to the frame structures 20 for allowing securing of the frame structures 20 within the main frame 18 as shown in FIG. 1 of the drawings thereby preventing rotation of the frame structures 20. The securing structure 21 is preferably comprised of a shaft member with a spring attached that is received within an aperture of the main frame 18 as shown in FIG. 1 of the drawings. Upper retaining structures prevent the frame structures 20 from pivoting along a vertical plane. A pair of support members 22 prevent the frame structures 20 from pivoting past a horizontal plane as best illustrated in FIG. 2 of the drawings.

Figure 7:
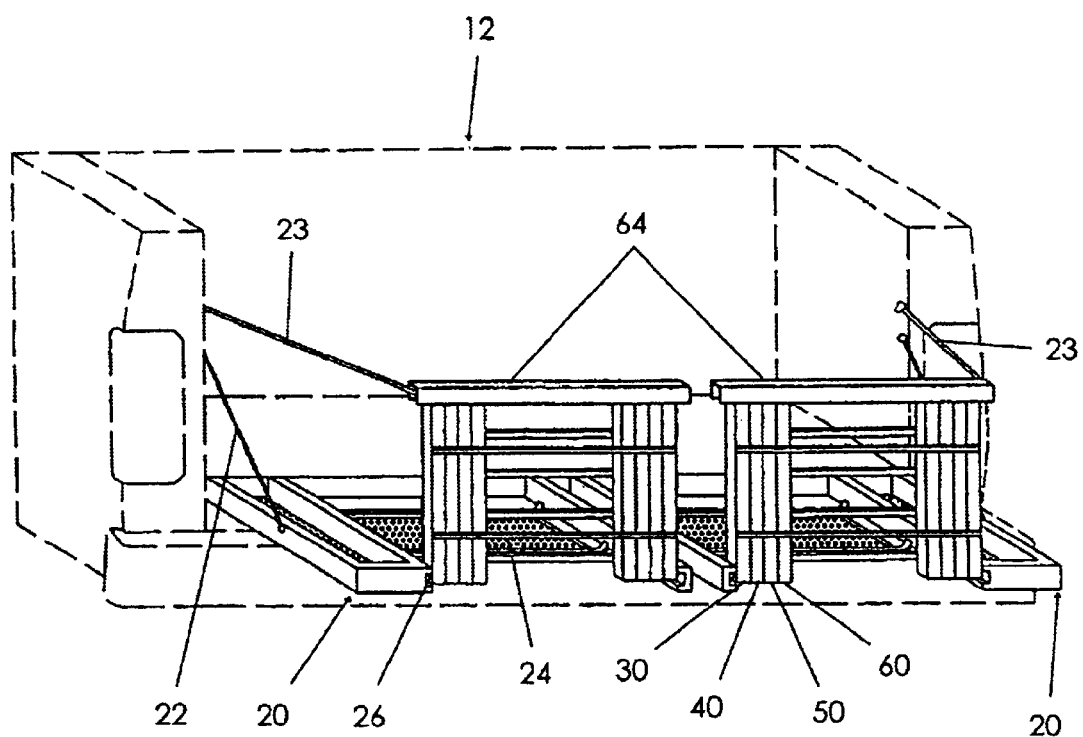
FIG. 7 is an upper perspective view of the present invention attached to a pickup box with the ramp sections pivoted upwardly in a vertical manner for extending the length of the pickup box.

FIG. 7 illustrates an alternative use of the present invention comprising a pair of upper members 23 that attach between the pickup box 12 and the upper end of the frame structures 20 when positioned vertically. This alternative use allows for the pickup box 12 to be effectively lengthened.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tailgate ramp system, comprising a main frame pivotally attachable within a pickup box for selective movement between vertical and horizontal positions;

a pair of frame structures, pivotally coupled to said main frame for separately operable movement within a horizontal plane between open and closed positions;

a pair of telescoping units attached within said frame structures;

wherein said telescoping units are pivotally attached within said main frame for selective movement in cooperation with said main frame between said vertical and horizontal positions; and said pair of telescoping units having a plurality of sections that extend outwardly.

2. The tailgate ramp system of claim 1, wherein said plurality of sections each have a first section that is slidably retained within said frame structures.

3. The tailgate ramp system of claim 2, wherein said frame structures each include inner frame channels that slidably receive a plurality of roller members extending from said first section.

4. The tailgate ramp system of claim 1, wherein said plurality of sections are slidably attached to one another.

5. The tailgate ramp system of claim 4, wherein said plurality of sections each have at least one set of roller members that are received within corresponding channels within said plurality of sections.

6. The tailgate ramp system of claim 1, including a securing structure for preventing rotation of said frame structures.

7. The tailgate ramp system of claim 1, wherein said plurality of sections include an end member attached to the distal end thereof.

8. The tailgate ramp system of claim 1, wherein said plurality of sections each include at least one cross member.

9. The tailgate ramp system of claim 8, wherein said at least one cross member has a U-shaped structure.

10. The tailgate ramp system of claim 1, including a grate member attached to said frame structure.

11. A tailgate ramp system, comprising:

a main frame pivotally attachable within a pickup box for selective movement between vertical and horizontal positions;

a pair of frame structures pivotally coupled to said main frame for separately-operable movement within a horizontal plane;

a pair of telescoping units pivotally attached within said main frame for cooperative movement with said main frame between said vertical and horizontal positions, said pair of telescoping units having a plurality of sections that extend outwardly;

wherein said pair of telescoping members are attached to said frame structures, and a pair of upper members separate from said main frame for attachment between a pickup box and respective end members of said pair of telescoping units when said main frame is at said horizontal position.

12. The tailgate ramp system of claim 11, wherein said plurality of sections each have a first section that is slidably retained within said frame structures.

13. The tailgate ramp system of claim 12, wherein said frame structures each include inner frame channels that slidably receive a plurality of roller members extending from said first section.

14. The tailgate ramp system of claim 11, wherein said plurality of sections are slidably attached to one another.

15. The tailgate ramp system of claim 14, wherein said plurality of sections each have at least one set of roller members that are received within corresponding channels within said plurality of sections.

16. The tailgate ramp system of claim 11, including a securing structure for preventing rotation of said frame structures.

17. The tailgate ramp system of claim 11, wherein said plurality of sections include an end member attached to the distal end thereof.

18. The tailgate ramp system of claim 11, wherein said plurality of sections each include at least one cross member.

19. The tailgate ramp system of claim 18, wherein said at least one cross member has a U-shaped structure.

20. The tailgate ramp system of claim 11, including a grate member attached to said frame structure.

* * * * *